United States Patent [19]

Campian

[11] Patent Number: 4,849,911

[45] Date of Patent: Jul. 18, 1989

[54] METHOD FOR IMPUTTING DATA TO A COMPUTER AIDED DESIGN SYSTEM

[75] Inventor: Jon R. Campian, Pontiac, Mich.

[73] Assignee: Modern Body and Engineering Corp., Madison Heights, Mich.

[21] Appl. No.: 911,471

[22] Filed: Sep. 25, 1986

[51] Int. Cl.[4] ............................................. G06F 15/68
[52] U.S. Cl. ..................................... 364/521; 340/734
[58] Field of Search ....................... 364/518, 519, 520; 340/734

[56] References Cited

U.S. PATENT DOCUMENTS

| | | | |
|---|---|---|---|
| 3,636,328 | 1/1972 | Korelitz et al. | 364/512 |
| 3,867,616 | 2/1975 | Korelitz et al. | 364/512 |
| 4,018,989 | 4/1977 | Snyder et al. | 178/18 |
| 4,181,954 | 1/1980 | Rosenthal et al. | 364/520 |
| 4,206,314 | 6/1980 | Prugh et al. | 178/19 |
| 4,428,056 | 1/1984 | Schroeder et al. | 364/518 |
| 4,447,882 | 5/1984 | Walz | 364/521 |
| 4,468,743 | 8/1984 | Dunn et al. | 364/520 |
| 4,479,032 | 10/1984 | Parnell | 178/19 |
| 4,496,944 | 1/1985 | Collmeyer et al. | 340/723 |
| 4,500,917 | 2/1985 | Yamada | 358/75 |
| 4,553,215 | 11/1985 | Masada et al. | 364/525 |
| 4,575,628 | 3/1986 | Bankart et al. | 250/235 |
| 4,578,766 | 3/1986 | Caddy | 364/521 |

Primary Examiner—Gary V. Harkcom
Assistant Examiner—Randy W. LaCasse
Attorney, Agent, or Firm—Gifford, Groh, Sheridan, Sprinkle and Dolgorukov P.C.

[57] ABSTRACT

A method for inputting data representing an engineering drawing to a computer aided design system. The method comprises the steps of creating the engineering drawing on quadrille paper or graph paper having crisscrossing lines. After creation of the drawing, the drawing is scanned by an optical reader which produces an electrical output signal representative of the drawing data. This output signal is electrically connected as an input signal to the computer aided design system. When editing the drawing, a computer generated grid pattern corresponding in scale to the criss crossing lines on the quadrille paper is superimposed on a video monitor of the computer aided design system thereby facilitating editing of the drawing on the computer aided design system.

2 Claims, 1 Drawing Sheet

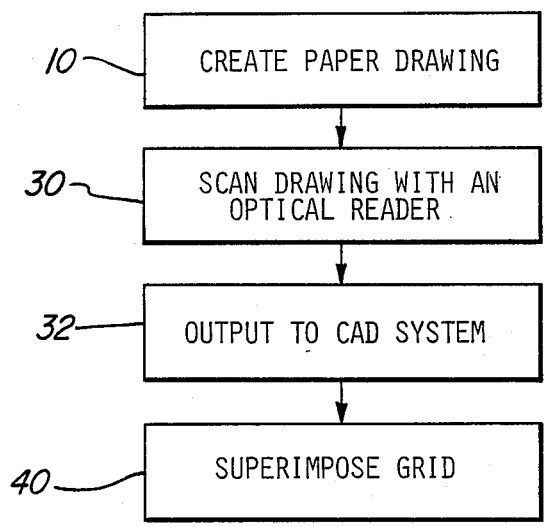
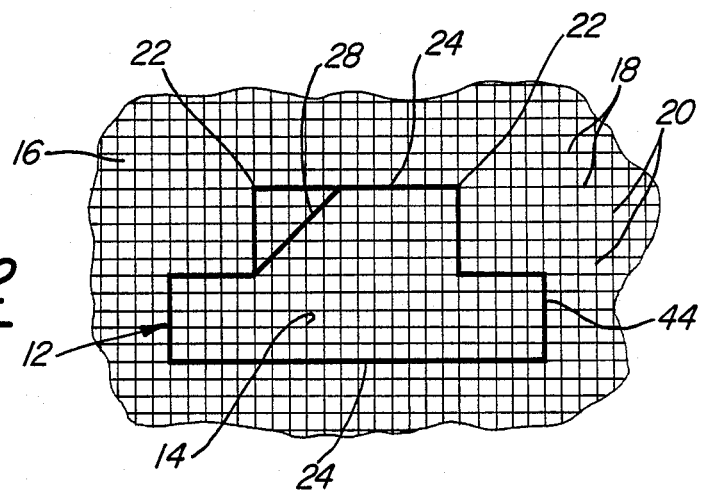
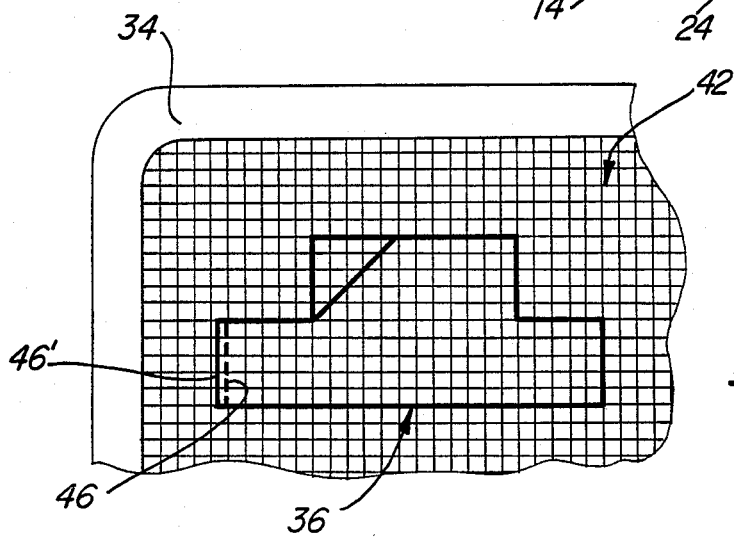

METHOD FOR IMPUTTING DATA TO A COMPUTER AIDED DESIGN SYSTEM

BACKGROUND OF THE INVENTION

I. Field of the Invention

The present invention relates generally to computer aided design systems and, more particularly, to a method for facilitating the inputting of data representing drawings in computer format to a computer aided design system.

II. Description of the Prior Art

The current trend in high technology manufacturing is to employ computer aided design (CAD) systems as well as computer aided machining (CAM) systems in manufacturing operations. In CAD systems, the engineering drawing for the part and/or tooling to create the part is represented in computer readable form which can be displayed on a video monitor at the CAD system. In many cases, the CAD system generates output data to a CAM system which, in turn, initiates and completes the manufacture of that part or the tooling.

A major disadvantage of the presently known CAD systems, however, is that it is very difficult and time consuming to input the necessary data to the CAD system from a paper engineering drawing of the part in question. Typically, the part is drawn on blank drafting paper and, once drawn, the blank paper is read or scanned by an optical reader.

The optical reader as well as the manual drafting operation, however, is inherently inaccurate. Because of this, after the drawing is read by the optical reader and the output from the reader fed as an input signal to the CAD system, essentially each and every line on the drawing must be individually edited by the CAD operator. Such editing entails manually measuring the distance between an origin on the paper drawing and various points and corners on the drawing. With this information, the CAD operator edits the corresponding point on the CAD system until the entire drawing has been edited and is ready for use in a CAM system.

SUMMARY OF THE PRESENT INVENTION

The present invention provides a method which facilitates the inputting of data representing an engineering drawing to a CAD system.

In brief, the method of the present invention comprises the step of creating the engineering drawing on quadrille paper which is also sometimes known as graph paper. The quadrille paper has a first set of spaced apart and parallel horizontal lines and a second set of spaced apart and parallel vertical lines. Thus, the lines of the first and second set criss-cross each other and form a plurality of squares on the paper.

In the preferred form of the invention, the spacing between the adjacent lines in either the first or second set is the same as the tolerance which is applicable to the part represented by the engineering drawing. For example, if the part has a tolerance level of plus or minus one quarter inch, i.e. accuracy of greater than one quarter inch on the drawing is not or only rarely required, the spacing between the lines of the first and second set of the quadrille paper will also be one quarter inch. In this fashion, substantially every corner of the drawing will lie on one of the corners of the squares on the quadrille paper.

After the drawing is created, it is read by an optical scanner which generates an electrical output signal representative of the drawing. This electrical output signal is connected as an input signal to the CAD system. Thus, after entry of the signal from the optical reader to the CAD system, the drawing can be displayed on a video monitor at the CAD system.

A computer generated grid is then superimposed on the screen of monitor of the CAD system. Furthermore, this grid has criss crossing lines which correspond in scale to the spacing between the lines on the quadrille paper.

The process of (1) creating the drafting drawing on quadrille paper and then (2) superimposing a grid corresponding in scale to the quadrille paper on the video monitor for the CAD system greatly facilitates the editing of the drawing on the CAD system. In particular, since essentially all corners of the drawing lie on one of the corners of the grid superimposed on the screen, and also because essentially all of the lines of the drawing lie on one of the lines of the superimposed grid, the drawing can be rapidly edited at the CAD system and without the necessity of individually measuring lines on the paper drawing itself. Furthermore, in the event that a corner or line falls outside of the overall tolerance for the drawing, the actual position of that point can be readily ascertained by simply measuring the distance between the adjacent lines in the first and second set of the quadrille paper and then manually entering the precise location for the point on the monitor for the CAD system.

BRIEF DESCRIPTION OF THE DRAWING

A better understanding of the present invention will be had upon reference to the following detailed description when read in conjunction with the accompanying drawing wherein like reference characters refer to like parts throughout the several views, and in which:

FIG. 1 is a flow chart illustrating a preferred embodiment of the present invention;

FIG. 2 is a fragmentary view illustrating portion of an engineering drawing on quadrille paper; and FIG. 3 is a view illustrating the drawing of FIG. 2 displayed on a video monitor of a CAD system.

DETAILED DESCRIPTION OF A PREFERRED EMBODIMENT OF THE PRESENT INVENTION

With reference first to FIGS. 1 and 2, the first step 10 of the present invention comprises the step of creating an engineering drawing 12 (FIG. 2) of the part 14 in question on paper 16. Unlike normal drafting paper, however, the paper 16 is quadrille paper thus having a grid formed by a first set of substantially horizontal lines 18 and a second set of substantially vertical lines 20. The horizontal lines 18 in the first set are spaced apart from each other by a predetermined amount while the vertical lines 20 are parallel to each other and spaced apart from each other by the same predetermined amount.

Furthermore, the spacing between either of the lines 18 or the lines 20 is equal to the accuracy or tolerance of the part drawing. For example, if the accuracy or tolerance of the part drawing is one quarter inch, essentially all of the corners 22 of the part 14 will lie on an intersection of two lines 18 and 20 and, similarly, essentially all of the straight lines 24 of the drawing 12 will either (1) lie on one of the lines 18 or 20 or (2) begin and stop at intersections of the lines 18 and 20 as shown at 28.

After the paper drawing 12 is completed, the drawing 12 is scanned at step 30 (FIG. 1) by an optical reader (not shown). The optical reader generates an electrical output signal representative of the drawing at step 32 to a CAD system. Furthermore, both the optical reader and the CAD system can be of any conventional construction so that further description thereof is unnecessary.

With reference now to FIGS. 1 and 3, the CAD system includes a video monitor 34 on which a video image representation 36 of the part 14 can be displayed from the data received from the optical scanner. CAD systems also typically include software for manipulating the video image 36, such as scaling, moving and rotating the image 36.

At step 40 a grid 42 is superimposed on the monitor 34 which corresponds in scale to the criss crossing lines 18 and 20 on the quadrille paper 16. Thus, if one line 44 has an overall length equal to the distance between two horizontal lines 18 on the quadrille paper, the same line 44, when displayed on the monitor 34, has an overall length equal to the distance between two horizontal lines on the grid 42 regardless of the absolute distance between these two grid lines.

Since the lines on the grid 42 correspond to the grid formed by the quadrille paper, essentially all of the lines forming the part 14 will begin and end at corners of the grid and, likewise, essentially all straight lines overlie one of the grid lines. Thus, lines which the operator decides should overlie one of the grid lines but which lie off of one of the grid lines, such as line 46', are rapidly identified and quickly moved to their correct position as shown at 46 thereby greatly facilitating the inputting and editing of engineering drawings for the CAD system.

It should be understood, however, that some corners of the drawing 12 do not fall on corners of the quadrille paper 16. Even in this event, however, it is only necessary to measure the distance between the corner of the drawing 12 in question and the adjacent lines 18 and 16 and then to manually input this data into the CAD system. This manual editing is thus much faster and easier than measuring the distance between the point and a single origin on the engineering drawing as has been the previous practice.

From the foregoing, it can be seen that the present invention provides a simple, inexpensive and yet totally effective method for inputting data from a paper drawing to a CAD system and thereafter editing the drawing in the CAD system. Having described my invention, however, many modifications thereto will become apparent to those skilled in the art to which it pertains without deviation from the spirit of the invention as defined by the appended claims.

I claim:

1. A method for inputting and editing an engineering drawing to a computer aided design system having a video monitor, said drawing being created on quadrille paper having criss-crossing lines, said criss-crossing lines having a first and second set of spaced apart parallel lines, said lines in the first and second set being perpendicular to each other, comprising the steps of:
   optically reading said drawing on said quadrille paper and producing an electrical output signal representative thereof,
   electrically connecting said electrical output signal as an input signal to the computer aided design system to form a video image representation so that said drawing is displayed on said video monitor,
   superimposing a grid pattern on the video monitor of the computer aided design system corresponding in scale to the quadrille paper,
   editing said displaying drawing by comparison of said displayed drawing and said superimposed grid pattern and thereafter altering said video image representation to conform to said drawing on said quadrille paper,
   whereby comparison of said superimposed grid pattern with said drawing on said video monitor facilitates editing of said drawing.

2. The invention as defined in claim 1 wherein said drawing has a tolerance and wherein the spacing between adjacent parallel lines of either said first or second set corresponds to the tolerance of the drafting drawing.

* * * * *